May 18, 1965 T. S. MARSHALL 3,184,555

STEREOPHONIC ELECTROSTATIC PICK-UP

Filed July 13, 1959 2 Sheets-Sheet 1

INVENTOR
Thomas Stewart Marshall
his atty

INVENTOR
Thomas Stewart Marshall
by Dan Johnston
his atty

United States Patent Office 3,184,555

Patented May 18, 1965

3,184,555

STEREOPHONIC ELECTROSTATIC PICK-UP

Thomas Stewart Marshall, Swindon, England, assignor to The Garrard Engineering & Manufacturing Company Limited, Swindon, England Filed July 13, 1959, Ser. No. 826,584
Claims priority, application Great Britain, July 28, 1958, 24,234/58
5 Claims. (Cl. 179—100.41)

This invention relates to phonograph pick-ups of the type used for converting two channels of information carried by one groove of a phonograph record into two electrical signals, one corresponding to each channel, and more particularly to such pick-ups suitable for playing a phonograph record having the two channels modulated in directions at right angles to one another and both at an angle of 45° to the record playing surface.

An object of the present invention is to provide an improved pick-up construction of the type indicated in which, in the mechanical stage of the conversion of the channels of information into electrical signals, interaction between the two channels is substantially eliminated or reduced to a negligible minimum.

The present invention consists in a phonograph pick-up of the type indicated wherein a stylus lever, carrying a stylus at one end, is operatively connected centrally at its other end to a two-armed member, the arms of which extend at right angles to one another to operate transducers located adjacent their free ends, the member and stylus lever being resiliently mounted or mountable in a suitable housing such that, as the stylus tracks the groove of a phonograph record carrying two channels of information, movement of the stylus causes corresponding movement of the arms to influence the transducers associated therewith in accordance with the information recorded on each channel.

Figure 1:
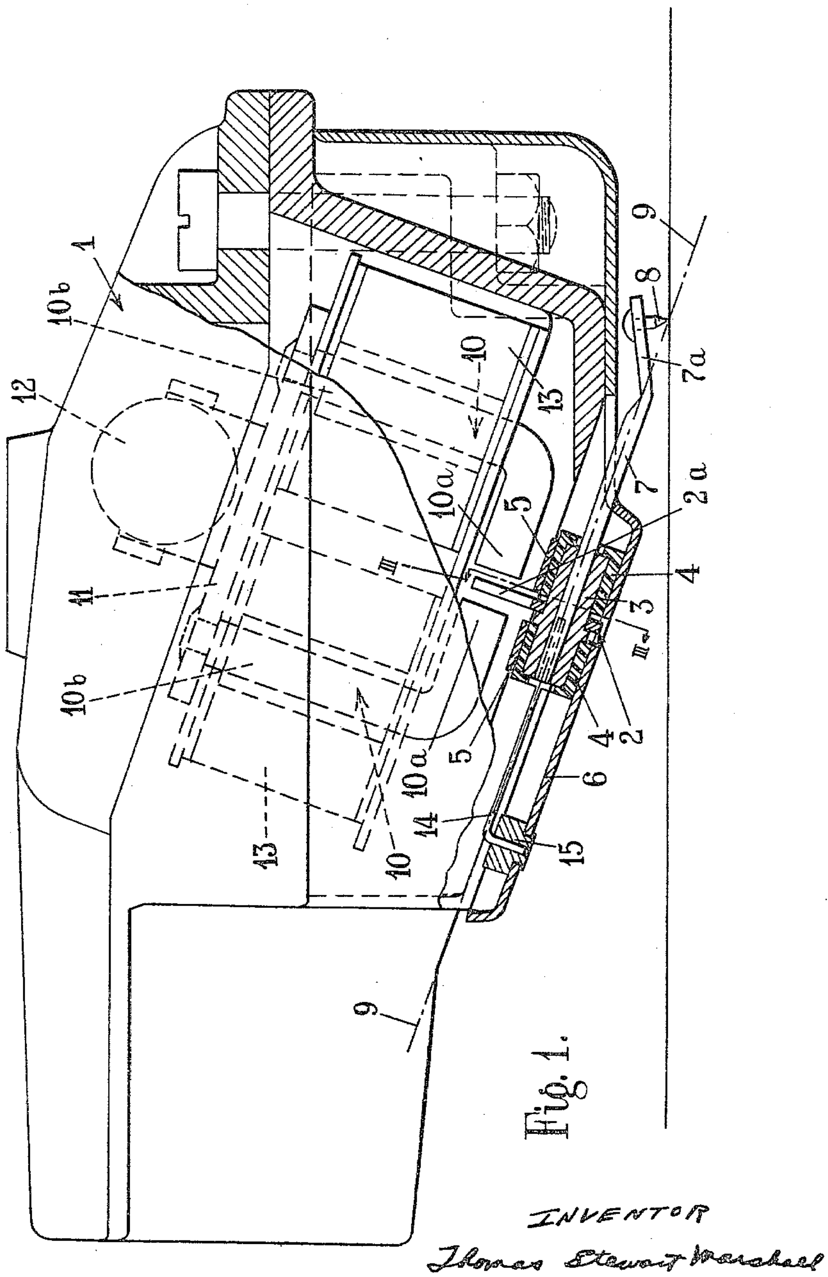
Figures 2, 3:
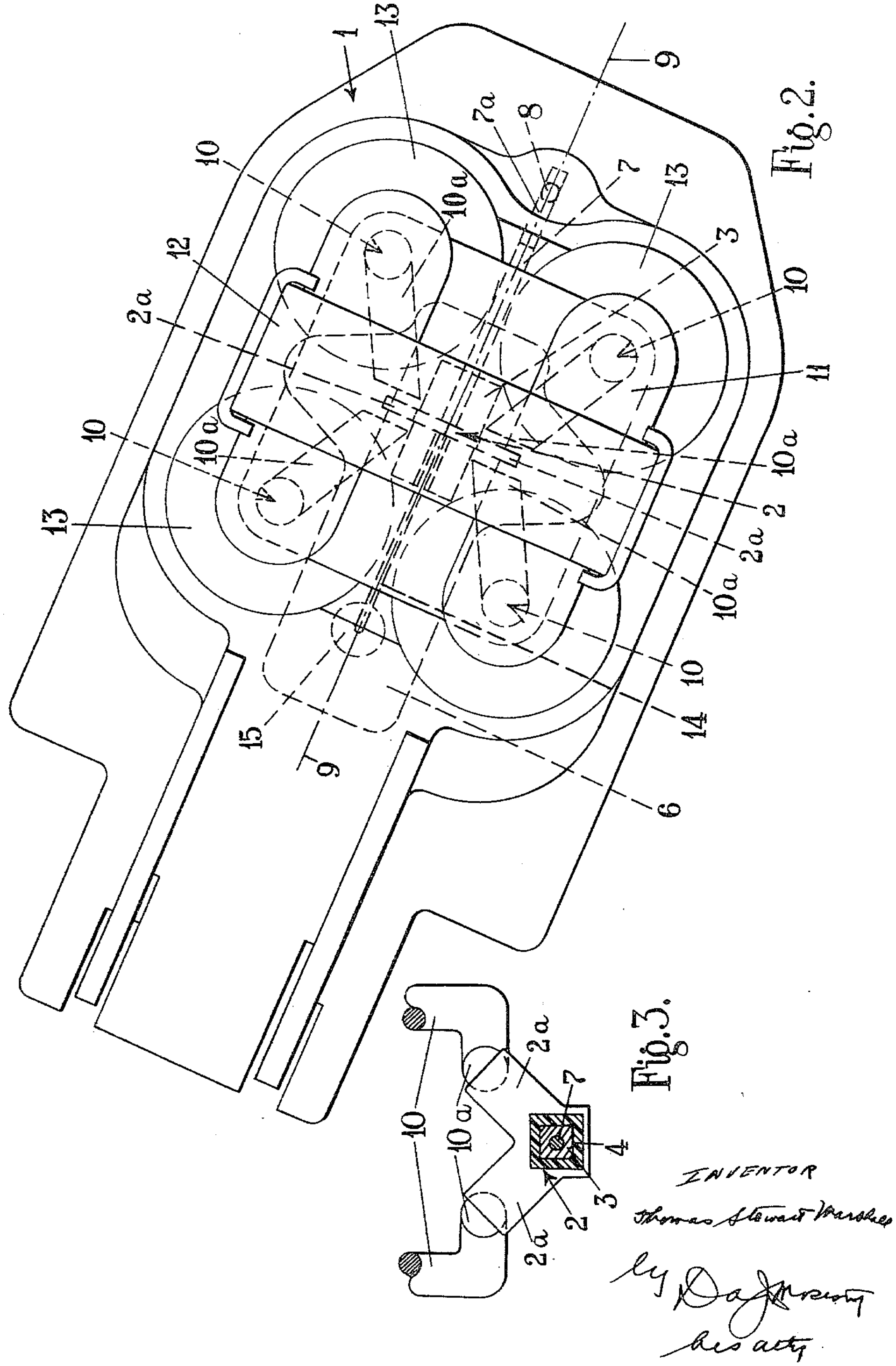

In the accompanying drawings:

FIGURE 1 is a side view of a gramophone pick-up according to the present invention with portions shown cut away for clarity, FIGURE 2 is a plan view of the pick-up shown in FIGURE 1, and FIGURE 3 is a fragmentary section taken on line III—III of FIGURE 1, with portions removed for clarity, showing diagrammatically the position of the member in relation to the pole shoes.

In carrying the invention into effect according to one convenient mode by way of example as shown in the accompanying drawings, a phonograph pick-up includes a housing 1 in which the other components of the pick-up are mounted.

A member 2 of suitable magnetic material and having two blade like arms 2*a* is fitted on an armature block 3 of nylon, the arms 2*a* of the member 2 extending at right angles to one another in a plane at right angles to the axis 9—9 of the block 3.

The armature block 3 is square in cross-section taken in a plane parallel to that containing the two arms 2*a* and is embraced by two damping sleeves 4 of resiliently flexible material such as for example, a rubbery plastic, which sleeves 4 are held by a clip 5 mounted upon a plate 6 which forms a lower closure for the housing 1.

While this arrangement permits restricted movement of the member 2 and block 3 in all directions, rotational movement of the block 3 about its axis 9—9 is particularly restricted and practically eliminated by virtue of the square cross-section of the block 3 and the arrangement of sleeves 4.

A stylus lever 7 is embedded in the block 3 along the axis thereof and extends forwardly through the plate 6 from the block 3 in cantilever fashion in a direction generally perpendicular to the plane containing the arms 2*a*. A stylus 8 is mounted at the forward end of the lever 7 and a forward portion 7*a* of the lever 7 is inclined upwardly such that the tip of the stylus 8 lies upon the axis 9—9 of the block 3. A retaining wire 14 extends rearwardly from the lever 7 to an anchorage 15 in the plate 6 for preventing or restricting movement of the lever 7 and stylus 8 in the direction of motion of the record groove at the stylus tip.

In this way, the assembly consisting of the stylus 8, stylus lever 7, block 3 and member 2, is resiliently mounted in the housing 1 such that movements of the tip of the stylus 8 as it traces the groove of a gramophone record are communicated to the arms 2*a* of the member 2, rotational movement of the block 3 about its axis 9—9 being eliminated or reduced to a minimum in the manner previously explained.

In an alternative arrangement, not shown, the stylus may be located such that a line drawn between its tip and the point about which the two arms 2*a* of the member 2 are dynamically balanced is perpendicular to the plane containing the two arms 2*a*. In this case it is not necessary to provide means for preventing rotation of the block 3 about its axis and therefore, if desired, the block may be of circular cross-section.

The tip of each arm 2*a* lies in a gap in a magnetic circuit and the member 2 therefore constitutes an armature for the magnetic circuit.

A pair of L-shaped pole shoes 10 are located adjacent the free end of each arm 2*a* such that the adjacent ends 10*a* of the shoes 10 form a magnetic gap and the other ends 10*b* of the shoes 10 are magnetically connected by bridge members 11 completing a magnetic circuit to a magnet 12 mounted in the housing. In this way a magnetic circuit is formed which extends from one pole of the magnet 12 through the adjacent bridge member 11 and through two branches formed by the adjacent pole shoes 10 to the adjacent armature arm 2*a*, the circuit then being completed through the other armature arm, the other branches formed by the other pole shoes 10, and the other bridge member 11 to the other pole of the magnet 12.

An electrical winding 13 is provided upon each pole shoe 10 such that a change in magnetic flux in each branch of each side of the magnet circuit will cause an electrical signal to be generated in the appropriate winding. The two windings on each side are connected as a pair in series and they are connected such that an increase in magnetic flux through one and a decrease in the other will have an additive effect to produce an electrical signal dependent upon both changes in magnetic flux.

In operation, when the pick-up is played on a gramophone record having two channels modulated in directions at right angles to one another and both at an angle of 45° to the record playing surface, the effect of the modulation of each channel is to cause one arm to twist or rotate about its longitudinal axis with negligible change in magnetic flux in the branches of the associated pole shoes and consequently a negligible electrical signal is generated in the associated pair of windings connected in series, while the end of the other arm moves across the gap between the other pole shoes to increase the flux in one branch thereof and decrease the flux in the other, with the consequent generation of an electrical signal in the associated pair of windings connected in series.

It will be appreciated that other suitable transducers may be employed for converting mounts at the ends of the armature arms into electrical signals.

Such a pick-up as hereinbefore described may be utilized to play phonograph records on which the two channels have been recorded laterally and vertically either by suitable external connections to the windings or by reorientation of the armature arms.

It will be appreciated further that the pick-ups as hereinbefore described is especially suitable for incorporation into a sound reproducing system arranged to afford a stereophonic effect, two channels being recorded simultaneously on the phonograph record from two different positions in relation to the source of sound and thereafter simultaneously reproduced by means of the pick-up connected to suitable amplifying equipment and two or more loud speakers spaced an appropriate distance apart.

I claim:

1. A phonograph pick-up for use with a record having two sound tracks in a single groove, the sound tracks being modulated in directions substantially perpendicular to each other; said pick-up comprising, in combination, a relatively elongated stylus lever; a stylus secured to said lever adjacent one end thereof to project laterally therefrom; a substantially flat transducer operating member, including a pair of perpendicularly related and substantially coplanar arms, said member being secured to said lever, substantially at the juncture of said arms, adjacent the opposite end of said lever with said arms lying in a plane substantially perpendicular to the length of said lever and each extending substantially parallel to the moduating direction of a respective one of the sound tracks; a pair of transducers each located adjacent the free end of, and in operative association with, a respective one of said arms; and means resiliently mounting said lever; said pick-up including a block on which said transducer operating member is mounted; said stylus lever being secured in and extending from said block; said resilient mounting means being operatively associated with said block.

2. A phonograph pick-up as claimed in claim 1 including sleeve means of resiliently flexible material mounting said block and constituting said resilient mounting means.

3. A phonograph pick-up as claimed in claim 1 wherein said block has a non-circular cross section in a plane parallel to the plane of the two arms of said transducer operating member.

4. A phonograph pick-up for use with a record having two sound tracks in a single groove, the sound tracks being modulated in directions substantially perpendicular to each other; said pick-up comprising, in combination, a relatively elongated stylus lever; a stylus secured to said lever adjacent one end thereof to project laterally therefrom; a substantially flat transducer operating member, including a pair of perpendicularly related and substantially coplanar arms, said member being secured to said lever, substantially at the juncture of said arms, adjacent the opposite end of said lever with said arms lying in a plane substantially perpendicular to the length of said lever and each extending substantially parallel to the modulating direction of a respective one of the sound tracks; a pair of transducers each located adjacent the free end of, and in operative association with, a respective one of said arms; and means resiliently mounting said lever; the construction and interrelation of said stylus lever and said stylus being such that a line drawn between the point of the stylus and the junction of the two arms of said transducer operating member is perpendicular to the plane of said two arms; said pick-up further including means operatively associated with said member and restraining rotational movement of the two arms thereof; said means comprising a block on which said transducer operating member is mounted, and from which said stylus lever extends; said block being of non-circular cross section in a plane parallel to that of the two arms of said member and constituting said means restraining rotational movement of said two arms.

5. A phonograph pick-up for use with a record having two sound tracks in a single groove, the sound tracks being modulated in directions substantially perpendicular to each other: said pick-up comprising, in combination, a relatively elongated stylus lever; a stylus secured to said lever adjacent one end thereof to project laterally therefrom; a substantially flat transducer operating member, including a pair of perpendicularly related and substantially coplanar arms, said member being secured to said lever, for movement therewith, substantially at the juncture of said arms, adjacent the opposite end of said lever with said arms lying in a plane substantially perpendicular to the length of said lever and each extending substantially parallel to the modulating direction of a respective one of the sound tracks; a pair of transducers each located adjacent the free end thereof, and in operative association with, a respective one of said arms; and means resiliently mounting said lever for oscillation responsive to undulations of said stylus whereby, responsive to undulations due to modulations of one sound track, said lever will bodily displace the respective associated one of said coplanar arms substantially normal to its general plane and relative to its transducer, while oscillating the other coplanar arm substantially about its longitudinal center line and without bodily displacing such other arm relative to its transducer.

References Cited by the Examiner

UNITED STATES PATENTS

| | | | |
|---|---|---|---|
| 1,804,961 | 5/31 | Thomas | 179—100.41 |
| 2,025,388 | 12/35 | Henning | 179—100.41 |
| 2,864,897 | 12/58 | Kaar | 179—100.41 |
| 2,934,610 | 4/60 | Dieter | 179—100.41 |
| 2,957,052 | 10/60 | Palo | 274—37 |

FOREIGN PATENTS

| | | |
|---|---|---|
| 789,367 | 1/58 | Great Britain. |

IRVING L. SRAGOW, *Primary Examiner.*

L. MILLER ANDRUS, STEPHEN W. CAPELLI, ELI J. SAX, *Examiners.*